D. S. FOX.
TOOL HOLDER.
APPLICATION FILED AUG. 19, 1915.
1,189,930.
Patented July 4, 1916.
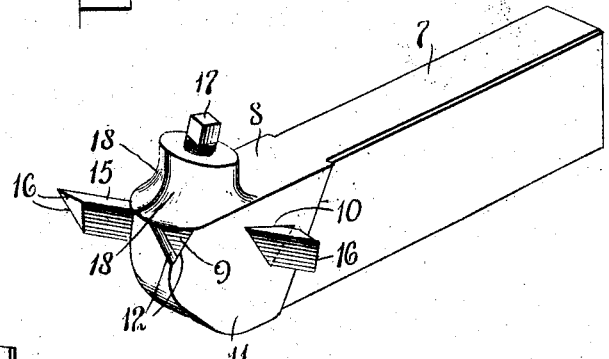
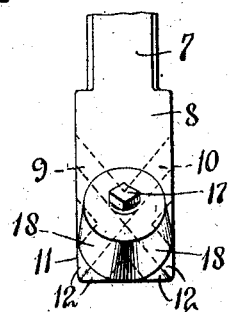
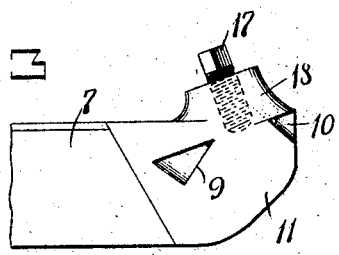
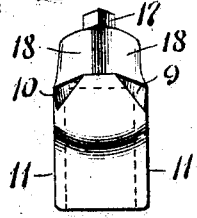
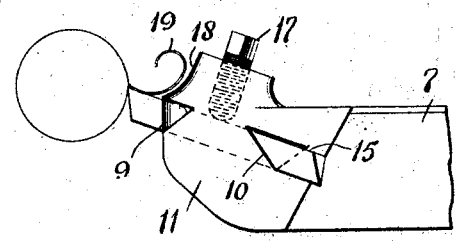
Witness
C. J. Hachenberg
Inventor
Daniel S. Fox
By Attorney

UNITED STATES PATENT OFFICE.

DANIEL S. FOX, OF CHESTER, CONNECTICUT.

TOOL-HOLDER.

1,189,930.     Specification of Letters Patent.     Patented July 4, 1916.

Application filed August 19, 1915. Serial No. 46,327.

*To all whom it may concern:*

Be it known that I, DANIEL S. Fox, a citizen of the United States of America, residing at Chester, Connecticut, have invented a new and useful Tool-Holder, of which the following is a specification.

The objects of my invention are to provide a simple and inexpensive tool holder construction in which the tool or cutter will be firmly and rigidly held, and wherein a variety of cutting faces and cutting angles are obtainable.

In accordance with my invention the shank or body of the tool holder is provided with diagonally intersecting tool-receiving passages of substantially triangular cross section and a cutter of substantially triangular cross section is employed having cutting faces on its opposite ends and which is held in set position in the passages by a clamp screw extending down through the top of the shank substantially at the point of intersection of the passages.

These and other features will appear more fully as the specification proceeds, reference being had to the accompanying drawing forming a part hereof, which illustrates a practical and preferred embodiment of the invention and wherein;—

Figure 1, is a perspective view of a lathe tool holder embodying the invention. Fig. 2, is a top plan view of the head portion of the tool-holding shank. Fig. 3, is a view of the right hand side of the shank. Fig. 4, is an end view of the same. Fig. 5, is a view of the left hand side of the same, illustrating the cutting operation. Fig. 6, is an end view of the cutter bar or tool proper.

The shank 7 or body of the device is of suitable shape and size to fit the tool post of the lathe or other machine in which the device is to be used. The working end of the shank is preferably, though not necessarily, thickened or built up into a head portion as indicated at 8 to give the necessary strength and rigidity about the tool-receiving passages. These passages are designated 9 and 10 and extend, as shown, on upward slants and on diagonally intersecting angles from the opposite sides 11 of the tool shank out through the end portion, of the shank, substantially at the end corners thereof. Said passages are preferably of triangular shape in cross section, as indicated, to provide the convergent side walls 12, forming substantially V-shaped trough bottoms to the passages.

The tool or cutter is in the form of a bar 15 of substantially triangular cross section and substantially conforming in the angle of its sides to the angle formed by the convergent side walls of the tool passages. A plurality of cutting faces 16 are preferably provided at each end of the cutter bar. This cutter bar is reversible end for end and by using it in the different passages, a considerable variety of angles and cutting faces can be obtained.

The cutter is clamped in its set position by a screw 17 engaged in the head and passing down through the top of the head substantially at the intersection of the obliquely extending passages therethrough. This screw therefore bears upon the uppermost flat side of the cutter bar irrespective of which passage said bar is located in and serves to force said bar downwardly into firmly seated engagement with the convergent side walls of the passage. The bar is thus rigidly held but at the same time can be readily released for purposes of adjustment or the substitution of different cutters by simply loosening the clamp screw slightly.

A feature of considerable practical importance is that, best illustrated in Figs. 3 and 5, of sloping or slanting the forward upper face 18 of the tool-holding head upward and to the rear substantially from the point of emergence of the tool. This, as clearly appears in Fig. 5 without weakening the head, provides clearance for the chip or cutting indicated at 19 curling up from the cutting edge of the tool, and prevents crowding of the cuttings toward the work.

It will be apparent from the foregoing that the tool holder constructed in accordance with my invention is very simple and can be inexpensively made, that the cutter is positively and firmly held in any of its many adjusted positions, and that crowding or jamming of the cuttings toward the work is avoided.

What I claim is:

1. In a tool holder, the combination of a shank provided with two forwardly extending upwardly inclined intersecting cutter-receiving passages extending obliquely from opposite sides of the shank out through opposite corners of the end portion of the shank, said passages intersecting each other substantially at the center of the shank and having side walls converging downwardly and forming substantially V-shaped bottoms to the passages, a cutter bar of a triangular cross section substantially conforming to the angularity of the convergent side walls of the passages received in said passages and seating in the V-shaped bottoms thereof, said cutter bar being reversible end for end in either of the passages and having cutter faces at its opposite ends to provide a variety of cutting faces at different angles and a clamp screw engaged in the top of the shank above the point of intersection of the cutter receiving passages and bearing on the flat upper side of the cutter seated in either passage, to thereby force the cutter bar downward in rigid engagement with the convergent side walls of the passage in which it is seated and hold the same against lateral movement.

2. In a tool holder, the combination of a shank having a tool-holding head at one end provided with intersecting cutter-receiving passages extending obliquely from opposite sides of the head out through the end portion of the head, said passages having side walls converging downwardly and forming substantially V-shaped bottoms to the passages, a cutter bar of a triangular cross section substantially conforming to the angularity of the convergent side walls of the passages received in said passages and seating in the V-shaped bottoms thereof, and a clamp screw engaged in the top of the head above the point of intersection of the cutter receiving passages and bearing on the flat upper side of the cutter seated in the passage, said tool-holding head having its forward end sloped upwardly and rearwardly from the points of emergence of the tool-holding passages therein on a curve approximating the curvature of a cutting made by the tool to guide the cutting and provide clearance upward from the cutting edge of the cutter for the cuttings.

DANIEL S. FOX.